(12) United States Patent
Compagno et al.

(10) Patent No.: US 10,924,540 B2
(45) Date of Patent: Feb. 16, 2021

(54) LIGHTWEIGHT NAMING SCHEME FOR AGGREGATING REQUESTS IN INFORMATION-CENTRIC NETWORKING

(71) Applicant: Cisco Technology, Inc., San Jose, CA (US)

(72) Inventors: Alberto Compagno, Paris (FR); Luca Muscariello, Paris (FR); Giovanna Carofiglio, Châtenay-Malabry (FR); Marcel Paul Enguehard, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 498 days.

(21) Appl. No.: 15/943,775

(22) Filed: Apr. 3, 2018

(65) Prior Publication Data
US 2019/0306233 A1  Oct. 3, 2019

(51) Int. Cl.
*H04L 29/08* (2006.01)
*G06F 16/901* (2019.01)
*G06F 16/22* (2019.01)
*H04W 72/04* (2009.01)
*H04W 84/18* (2009.01)

(52) U.S. Cl.
CPC ...... *H04L 67/1065* (2013.01); *G06F 16/2237* (2019.01); *G06F 16/901* (2019.01); *H04L 67/1093* (2013.01); *H04W 72/0406* (2013.01); *H04W 84/18* (2013.01)

(58) Field of Classification Search
CPC ............ H04L 67/1065; H04L 67/1093; H04L 67/0406; H04L 67/10; H04L 67/12; G06F 16/901; G06F 16/2237; G06F 16/903; H04W 84/18; H04W 4/70
See application file for complete search history.

(56) References Cited

U.S. PATENT DOCUMENTS 9,282,050 B2  3/2016 Mosko
2012/0317197 A1* 12/2012 De Foy ............... H04L 67/1093
709/204

(Continued)

OTHER PUBLICATIONS

Adhatarao, et al., Comparison of Naming Schema in ICN, 2016 IEEE International Symposium on Local and Metropolitan Area Networks (LANMAN), 6 pages, 2016, IEEE.

(Continued)

*Primary Examiner* — Albert M Phillips, III
(74) *Attorney, Agent, or Firm* — Behmke Innovation Group LLC; Kenneth J. Heywood; Jonathon P. Western

(57) ABSTRACT

In one embodiment, a device in a network receives an interest request for one or more pieces of content data available in the network. The interest request specifies the one or more pieces of content data via one or more bits sets in a content request bitmap of the interest request, each bit of the content request bitmap being associated with a different piece of content data. The device compares the content request bitmap to a content availability bitmap in a forwarding information base (FIB) of the device that is associated with a particular interface of the device and each bit of the content availability bitmap indicates whether a particular piece of content data is available via the particular interface. The device forwards the interest request via the particular interface, based on the comparison between the content request bitmap and the content availability bitmap in the FIB of the device.

20 Claims, 12 Drawing Sheets

(56) References Cited

U.S. PATENT DOCUMENTS

2014/0164552 A1    6/2014  Kim et al.
2014/0280823 A1    9/2014  Varvello et al.
2017/0325157 A1*  11/2017  Ly .................... H04W 48/14

OTHER PUBLICATIONS

Baccelli, et al., "Information Centric Networking in the IoT: Experiments with NDN in the Wild", ICN'14, Sep. 24-26, 2014, Paris, France., 10 pages, 2014, ACM.

Chen, et al., "Machine-to-machine communications: Technologies and challenges", Ad Hoc Networks, vol. 18, Jul. 2014, pp. 3-23, Elsevier B.V.

Compagno, et al., "OnboardICNg: a Secure Protocol for Onboarding IoT Devices in ICN", ICN'16, Sep. 26-28, 2016, Kyoto, Japan., 10 pages, 2016, ACM.

Dao, et al., "Securing Heterogeneous IoT with Intelligent DDoS Attack Behavior Learning", 7 pages, Nov. 17, 2017, arXiv:1711.06041v1, arXiv.org.

Enguehard, et al., "On the Cost of Secure Association of Information Centric Things", ACM-ICN '16 Proceedings of the 3rd ACM Conference on Information-Centric Networking, Kyoto, Japan., Sep. 26-28, 2016, pp. 207-208, 2016, ACM.

Enguehard, et al., "SLICT: Secure Localized Information Centric Things", ICN'16, Sep. 26-28, 2016, Kyoto, Japan., 6 pages, 2016, ACM.

Jacobson, et al.,"Networking named content", Communications of the ACM, vol. 55, Issue 1, Jan. 2012, pp. 117-124, ACM.

Teubler, et al., "Efficient Data Aggregation with CCNx in Wireless Sensor Networks", EUNICE 2013, LNCS 8115, pp. 209-220, 2013, IFIP International Federation for Information Processing.

Wang, et al., "ICN based Architecture for IoT-Requirements and Challenges (updated portion only)", https://www.ietf.org/proceedings/91/slides/slides-91-icnrg-1.pdf, IETF-91, IRTF/ICNRG, Honolulu, 33 pages, Accessed on Jan. 3, 2018, IETF.

Xiaoke, et al., "IS: Interest Set to Enhance Flow Transmission in Named-Data Networking", http://netarchlab.tsinghua.edu.cn/~junbi/ChinaComm-2016-1.pdf, Information-Centric Network, 2016, 7 pages, China Communications—Supplement No. 1.

Zhang, et al., "5. Advantages of using ICN for IoT", Design Considerations for Applying ICN to IoT, <draft-zhang-icnrg-icniot-01>, ICN Research Group, Internet-Draft, 18 pages, Jun. 26, 2017, IETF Trust.

"Network Security Analytics", https://www.extrahop.com/solutions/initiative/security/, 6 pages, Accessed on Jan. 3, 2018, ExtraHop Networks.

https://en.wikipedia.org/wiki/Named_data_networking; Named data networking—Wikipedia; pp. 1-10.

Wijnands et al. "Multicast Using Bit Index Explicit Replication (BIER)" Internet Engineering Task Force (IETF); Nov. 2017; pp. 1-43.

* cited by examiner

LIGHTWEIGHT NAMING SCHEME FOR AGGREGATING REQUESTS IN INFORMATION-CENTRIC NETWORKING

TECHNICAL FIELD

The present disclosure relates generally to computer networks, and, more particularly, to a light naming scheme for aggregating requests in information-centric networking.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room. However, with this expansion of the IoT also comes an ever growing body of available data and data consumers in a network.

Information-Centric Networking (ICN) is a recent networking paradigm that focuses on the retrieval of named data in a network. In contrast to network architectures that concentrate on simply delivering data requests between network endpoints (e.g., a data requester and a data source), ICN instead focuses on the network itself satisfying the data request, regardless of the initial data source. While this enhanced query mechanism addresses the challenge of extracting meaningful data from the network, networks comprising devices with very constrained resources (e.g., battery-powered devices, devices with low computational capabilities, etc.) may not be able to fully implement the ICN paradigm.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
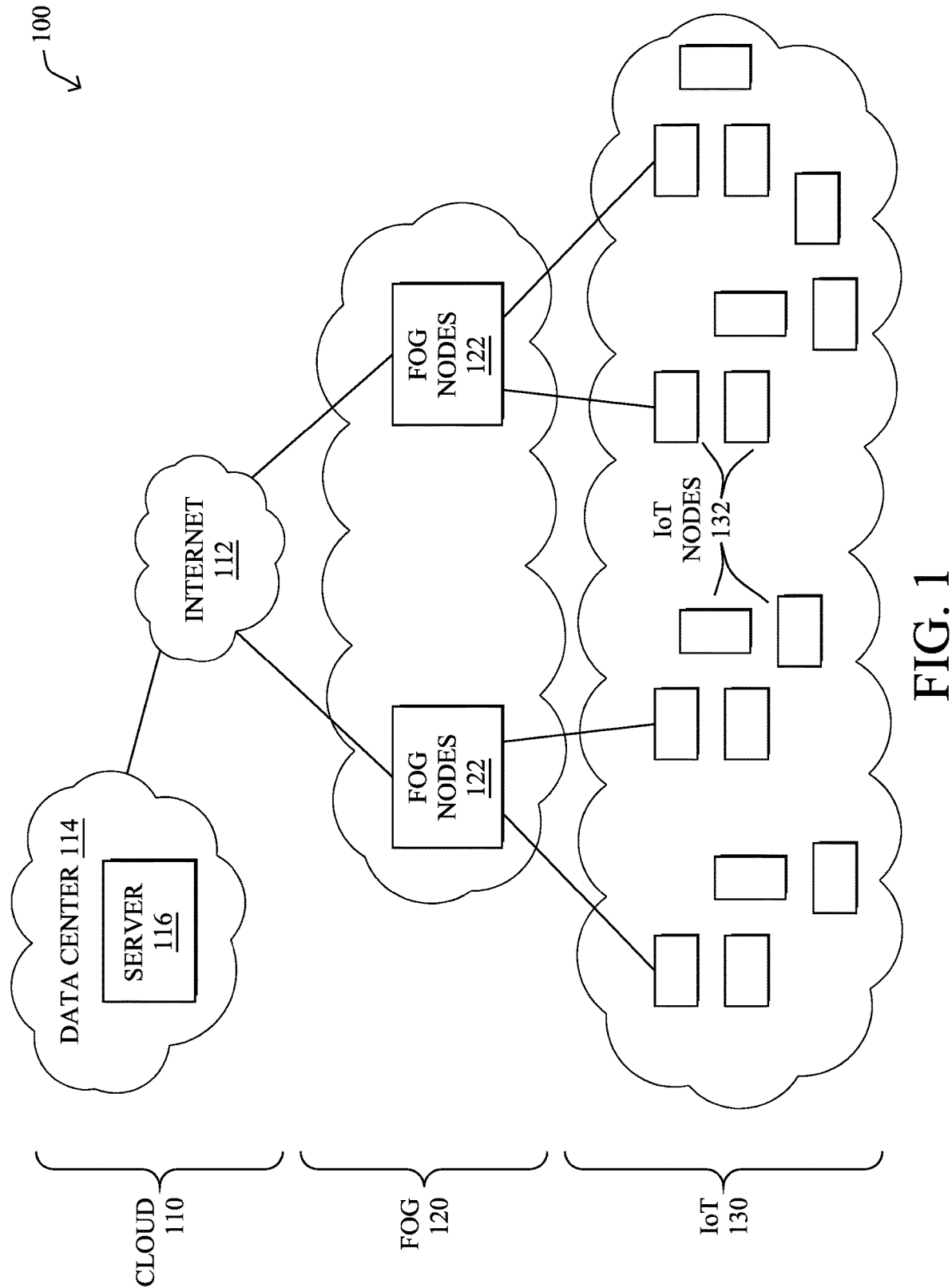
FIG. 1 illustrates an example computer network.

According to one or more embodiments of the disclosure, a device in a network receives an interest request for one or more pieces of content data available in the network. The interest request specifies the one or more pieces of content data via one or more bits sets in a content request bitmap of the interest request, each bit of the content request bitmap being associated with a different piece of content data. The device compares the content request bitmap to a content availability bitmap in a forwarding information base (FIB) of the device that is associated with a particular interface of the device and each bit of the content availability bitmap indicates whether a particular piece of content data is available via the particular interface. The device forwards the interest request via the particular interface, based on the comparison between the content request bitmap and the content availability bitmap in the FIB of the device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, a fog node 122 may operate as a root node for IoT nodes 132 in a local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
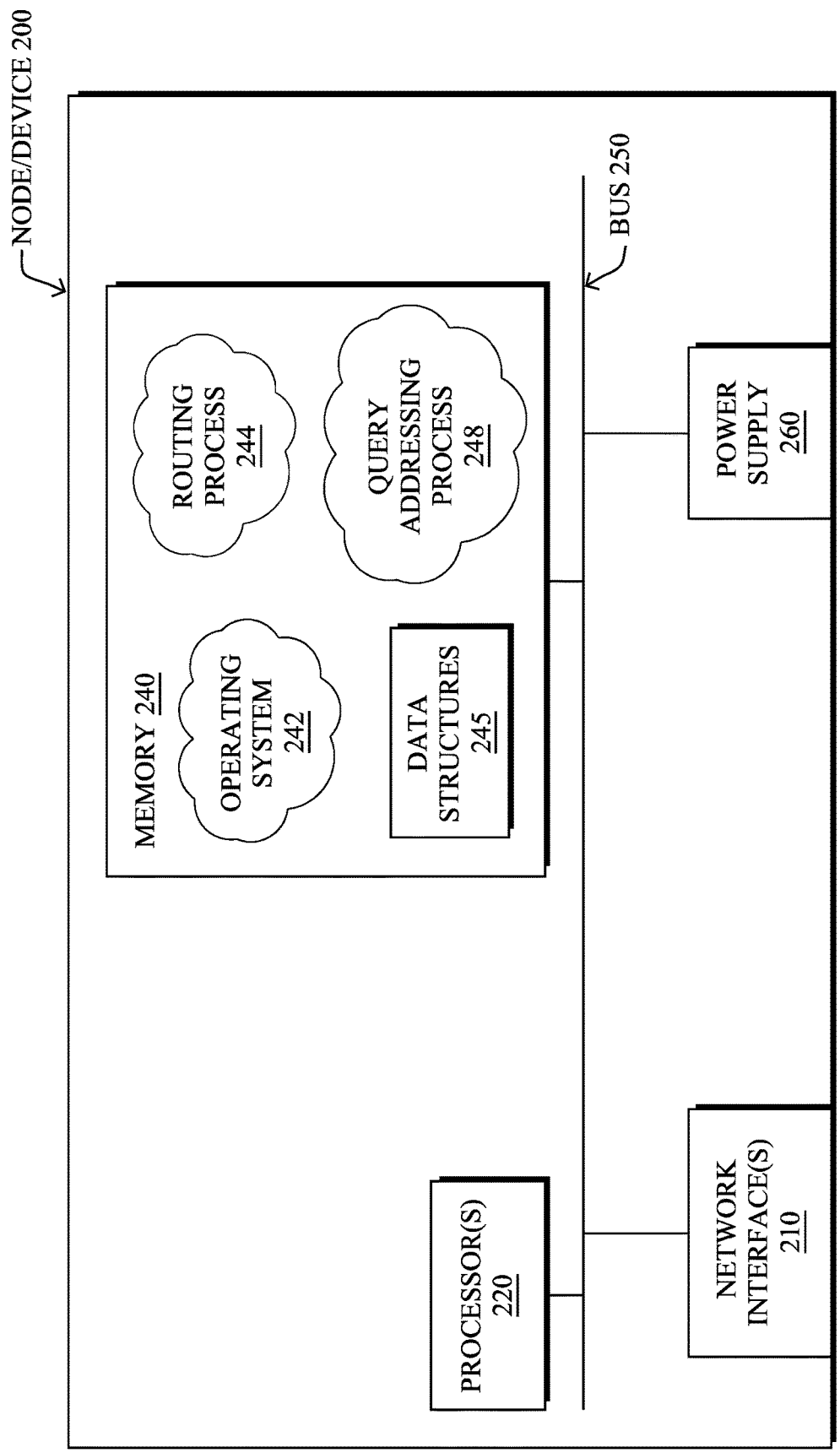
FIG. 2 illustrates an example network node/device.

FIG. 2 is a schematic block diagram of an example computing device/node 200 that may be used with one or more embodiments described herein e.g., as any of the devices shown in FIG. 1 above or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative routing process/services 244 and/or a query addressing process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as an Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

In some embodiments, routing process 244 may also leverage Bit Index Explicit Replication (BIER), as outlined in the Internet Engineering Task Force (IETF) Request for Comments (RFC) 8279 entitled "Multicast Using Bit Index Explicit Replication by Wijnands et al. For example, BIER may be used in a LLN as a compression technique that maps an IPv6 address or other network address of a device/node into a bit position in a bitmap, according to various embodiments. For example, consider the case in which the network includes nodes A-K. In such a case, the Root node of the LLN may negotiate with nodes A-K to allocate a bit position per node address, with only one address per node. Thus, nodes A-K may be represented by a bitmap having eleven bits, as shown in Table 1 below:

TABLE 1

| Node | Bit Position | Bitmap |
| --- | --- | --- |
| A | 1 | 10000000000 |
| B | 2 | 01000000000 |
| C | 3 | 00100000000 |
| D | 4 | 00010000000 |
| E | 5 | 00001000000 |
| F | 6 | 00000100000 |
| G | 7 | 00000010000 |
| H | 8 | 00000001000 |
| I | 9 | 00000000100 |

TABLE 1-continued

| Node | Bit Position | Bitmap |
| --- | --- | --- |
| J | 10 | 00000000010 |
| K | 11 | 00000000001 |

Using the above bit assignments, multicasting can be performed easily by performing a logical AND between addresses. For example, to multicast a packet to both nodes A and C, their corresponding bitmaps in Table 1 can be combined to form '10100000000.'

As noted above, Information-Centric Networking (ICN) presents a promising approach to addressing the ever-increasing amount of data available in a computer network, such as an LLN or IoT network. In contrast to other architectures, ICN operates by having the data consumer retrieve the named data desired by the consumer by issuing an interest packet. Rather than routing the interest packet to a specific host, ICN instead seeks to route the interest packet to the corresponding piece of content. This requires a smaller network stack than that of IP-based solutions for LLNs and allows for more efficient routing and on-boarding protocols. However, the limited resources that are typical of LLN nodes/devices may prevent the network from fully supporting ICN.

Two main issues remain, to make ICN truly energy-saving and computationally lightweight for deployment to LLNs:
1. The adoption of variable length names makes it challenging to build efficient data structures (e.g., PIT, CS, and FIB) on resource constrained nodes.
2. The pull-based communication model of ICN requires a data consumer to retrieve data in a unicast way, issuing an interest packet to each node/device. Considering the forwarding tree from the data consumer, a node will have to process and forward a number of packets that is twice (1 interest+1 data) the number of the nodes in its forwarding sub-tree. This is especially inefficient, in terms of both energy consumption and latency, in multi-hop wireless networks, where nodes are competing for access to the broadcast medium.

Lightweight Naming Scheme for Aggregating Requests in Information-Centric Networking The techniques herein introduce a naming scheme for ICN that enables multiple queries to be performed via a single ICN packet. In some aspects, the techniques use a bitmap to encode a collection of data names within an ICN interest packet. Doing so allows the queries to be efficiently multicast through the network, minimizing the energy consumption, latency, and required resources to perform the queries. Further aspects of the techniques herein provide for object-based security, in-network message aggregation, and mobility handling.

Specifically, according to one or more embodiments of the disclosure as described in detail below, a device in a network receives an interest request for one or more pieces of content data available in the network. The interest request specifies the one or more pieces of content data via one or more bits sets in a content request bitmap of the interest request, each bit of the content request bitmap being associated with a different piece of content data. The device compares the content request bitmap to a content availability bitmap in a forwarding information base (FIB) of the device that is associated with a particular interface of the device and each bit of the content availability bitmap indicates whether a particular piece of content data is available via the particular interface. The device forwards the interest request via the particular interface, based on the comparison between the content request bitmap and the content availability bitmap in the FIB of the device.

Illustratively, the techniques described herein may be performed by hardware, software, and/or firmware, such as in accordance with the query addressing process 248, which may include computer executable instructions executed by the processor 220 (or independent processor of interfaces 210) to perform functions relating to the techniques described herein, e.g., in conjunction with routing process 244.

Operationally, the techniques herein introduce an alternate approach to representing content data in data requests than that used in traditional ICN approaches. Notably, ICN typically makes use of content names that each represents a different piece of content data in the network (e.g., different sensor readings, etc.). These content names are typically expressed in a universal resource locator (URL)-like manner. For example, a particular temperature reading may be represented as "Sensor A/Temperature/Measurement_1" in the ICN-based network.

In various embodiments, the techniques herein propose that ICN names in a local network be mapped to a bitmap of size N, where N is the total number of represented names and each bit of the bitmap is associated with a different name. This mapping can be performed in a central manner (e.g., by the API gateway or other supervisory device) and propagated to the other nodes/devices in the network for use. To retrieve several pieces of data content from the network at once, a data consumer node may send an ICN interest packet into the network that includes an N-sized bitmap where only the bits corresponding to the desired data are set. In doing so, the interest packet aggregates several data requests.

Similarly, in further embodiments, the techniques herein also allow for the aggregation of multiple pieces of data within the data packet(s) carrying the query results. For example, to form such a combined data packet, each of the different pieces of content data may be concatenated in the same order as their corresponding bits in the bitmap. Each piece of data can also be encoded with the regular ICN type-length-value (TLV) for data.

Generally speaking, there are two types of packets involved in any ICN query:

1.) Interest packets—this packet identifies the content data that is being requested from the network.

2.) Data packets—when an interest packet reaches a node that has the requested content data, the node returns the requested data via a data packet that also includes the identifier for the content data. Typically, the immutable fields of the ICN data packet (e.g., name and payload) are signed, but not the mutable ones (e.g., TTL).

With respect to routing interest and data packets, each ICN router in the network may maintain any or all of the following data structures:

1.) Pending Interest Table (PIT)—this table stores information regarding all of the interests that the router has forward, but has not yet received a corresponding data packet with the requested content data.

2.) Forwarding Information Base (FIB)—this table maps identifiers to interfaces and is populated by the routing protocol in use.

3.) Content Store (CS)—this data structure tracks ICN data packets that can be temporarily stored by the router, thereby allowing the router to use the cached copy to fulfill future interests received by the router. The storage parameters (e.g., length of time, total memory consumed, etc.) may be set as desired, depending on the router and the data.

FIGS. 3A-3D illustrate example table operations for a network node/device, according to various embodiments. As shown in FIGS. 3A-3D generally, the data structures of an ICN router (e.g., data structures 245 of a device/node 200) be configured to operate in conjunction with the bitmap-based naming scheme disclosed herein.

Figure 3A:
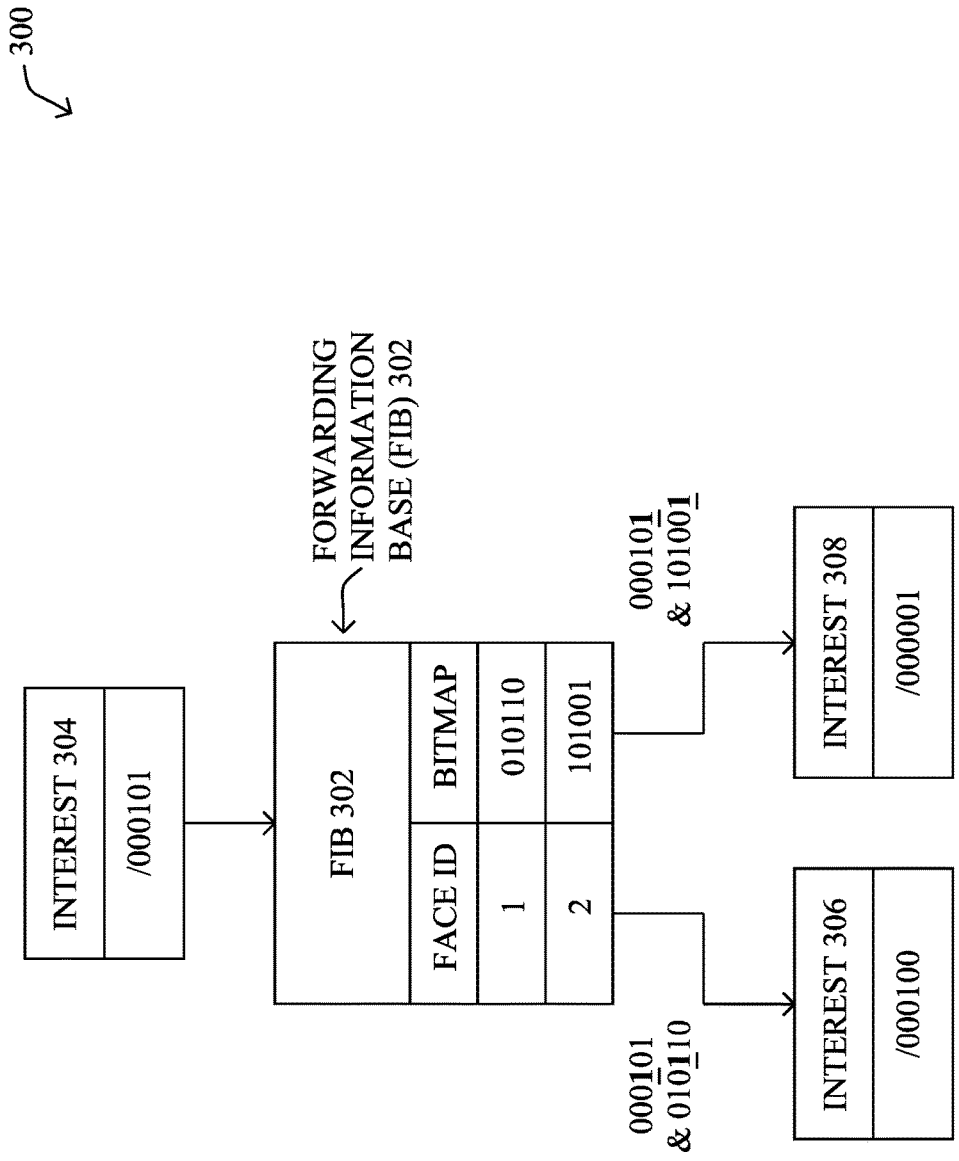
FIGS. 3A-3D illustrate example table operations for a network node/device.

FIG. 3A illustrates an example 300 of a forwarding information base (FIB) 302 that the ICN router may maintain. In various embodiments, FIB 302 may map each ICN (inter)face to a bitmap of size N, where there are N-number of content names in use. Fields of a content availability bitmap in FIB 302 are set to '1' if the corresponding name can be retrieved by the associated ICN face. For example, the face id of '1' may be associated with the content availability bitmap '010110,' indicating that the second, fourth, and fifth content names can be retrieved using this face, as read from left to right. Similarly, face id of '2' may be associated with the content availability bitmap '101001,' indicating that the first, third, and sixth content names can be retrieved using this face.

In various embodiments, the ICN router may process an incoming interest packet 304 by performing a lookup of the indicated pieces of content data in FIB 302. More specifically, assume that interest packet 304 includes the content request bitmap of '000101,' indicating that the fourth and sixth pieces of content data are desired by the originator of interest packet 304.

To perform a FIB lookup, the ICN router may perform a bitwise AND operation on the content request bitmap from interest packet 304 and the content availability bitmaps of each face in FIB 302. For each face, this AND operation also outputs the bitmap that must be forwarded to it. By way of example, for face id '1,' the AND operation of '000101' and '010110' results in a new content request bitmap of '000100' that can be included in interest packet 306 sent via face '1.' Similarly, for face id '2,' the AND operation of '000101' and '101001' results in a new content request bitmap of '000001' that can be included in interest packet 308 sent via face '2'.

Figure 3B:
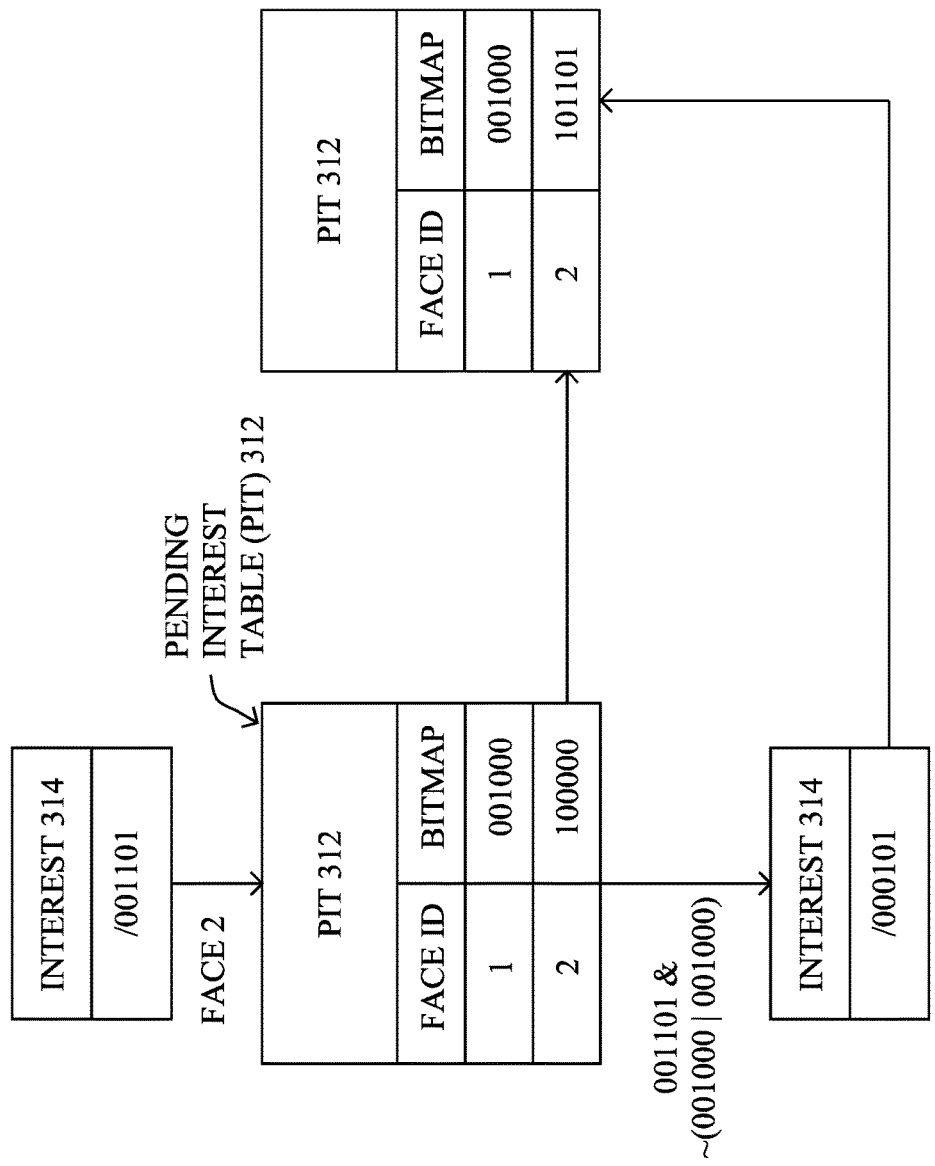

FIG. 3B illustrates an example 310 of a pending interest table (PIT) 312 that the ICN router may maintain. In various embodiments, PIT 312 may map each ICN face to an outstanding interest bitmap of size N, where the bitmap for a given face indicates the set of interests received from that face, but not yet satisfied, from the next hop in the same PIT entry. For an incoming interest with content request bitmap i from face k and a PIT with a set of outstanding interest bitmaps p, the ICN router may perform two operations. First, the received interest is filtered by the PIT, thus aggregating pending requests. This is done by performing the logical operation of (i AND NOT p[j]) for each row p[j] of the PIT. Next, the entry for the incoming face is updated by (p[k]:=p[k] & i).

In the example shown, consider the case in which interest 314 arrives from face '2' and includes the content request bitmap of '001101' In such a case, the router may filter this bitmap against the entries in PIT 312, as described above. Notably, the logical operations of ~(001000 | 100000) gives '010111,' which can be used as a filter on interest 314 by performing a logical AND operation. This results in interest 314 being filtered as '001101' AND '010111'='000101' In other words, since an interest is already pending and not yet satisfied for the third piece of content data, interest 314 need only request the fourth and sixth pieces of content data. On forwarding the updated interest 314 on face '2,' the ICN router may also update PIT 312, accordingly.

Figure 3C:
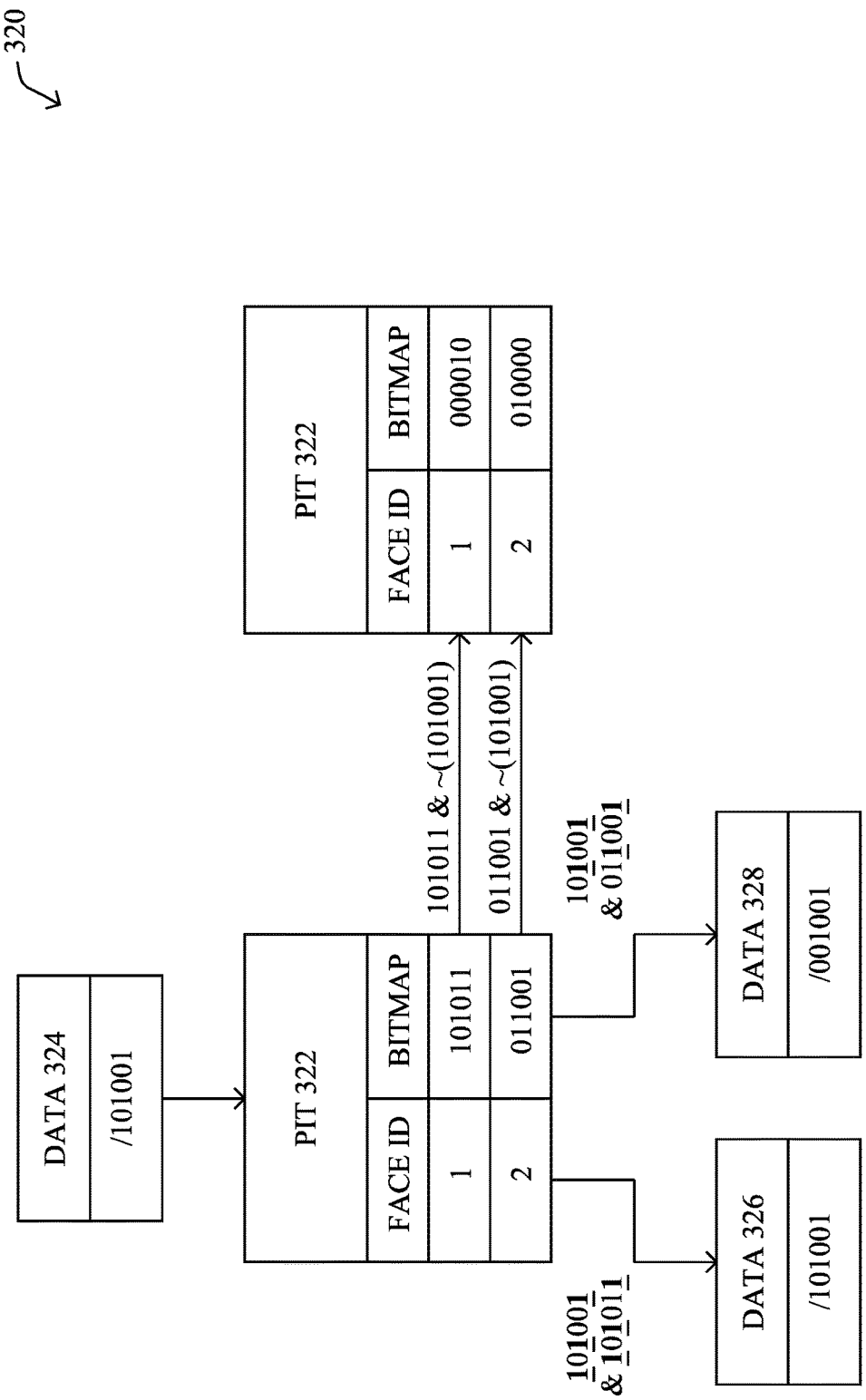

FIG. 3C illustrates an example 320 of the operation of a PIT when the ICN router receives an ICN data packet that includes one or more pieces of requested content data. In various embodiments, for an incoming data packet with bitmap d, the router may perform a logical AND operation for each face p[i] in the PIT. The result of that AND operation gives out the bitmap that must be forwarded to the face i. The PIT entries are then updated by performing (p[i] AND NOT d).

For example, consider PIT 322 that maps outstanding interest bitmap '101011' to face id '1' and outstanding interest bitmap '011001' to face id '2' In other words, the router is still waiting for responses to interests for the first, third, fifth, and sixth pieces of content data that were received via face '1' and for the second, third, and sixth pieces of content data that were received via face '2'.

When the router receives data packet 324 that includes bitmap '101001' (e.g., indicating the ICN data packet includes the first, third, and sixth pieces of content data), the router may perform a logical AND between the bitmap of data packet 324 and those of the faces of PIT 322. Specifically, calculating the logical operation of ('101001' AND '101011') for face id '1' gives '101001.' In turn, the router may generate data packet 326 with the first, third, and sixth pieces of content data and include this bitmap to identify the pieces of content in the packet. Similarly, calculating '101001' AND '011001' for face id '2' gives '001001' In turn, the router can form a data packet 328 that includes the third and sixth pieces of content data and the bitmap to identify these pieces of content in the packet.

The router may also update PIT 322 for each face, based on the received data packet 324. For example, for face id '1,' the router may combine the bitmap of '101001' of data packet 324 with the inverse of '101011' (as calculated using a logical NOT) using an AND operation, to update the bitmap entry for this face as '000010' In other words, since interests were pending on face '1' for the first, third, fifth, and sixth pieces of content data, and data packet 324 includes the first, third, and sixth pieces of content data, the router may update the bitmap entry in PIT 322 for this face to indicate that only the interest for the fifth piece of content data is now outstanding. Similarly, since data packet 324 satisfies all of the outstanding interests for face '2' except the second piece of content, the router may update this bitmap entry to indicate that only the second piece of content data has an outstanding interest on this face.

Figure 3D:
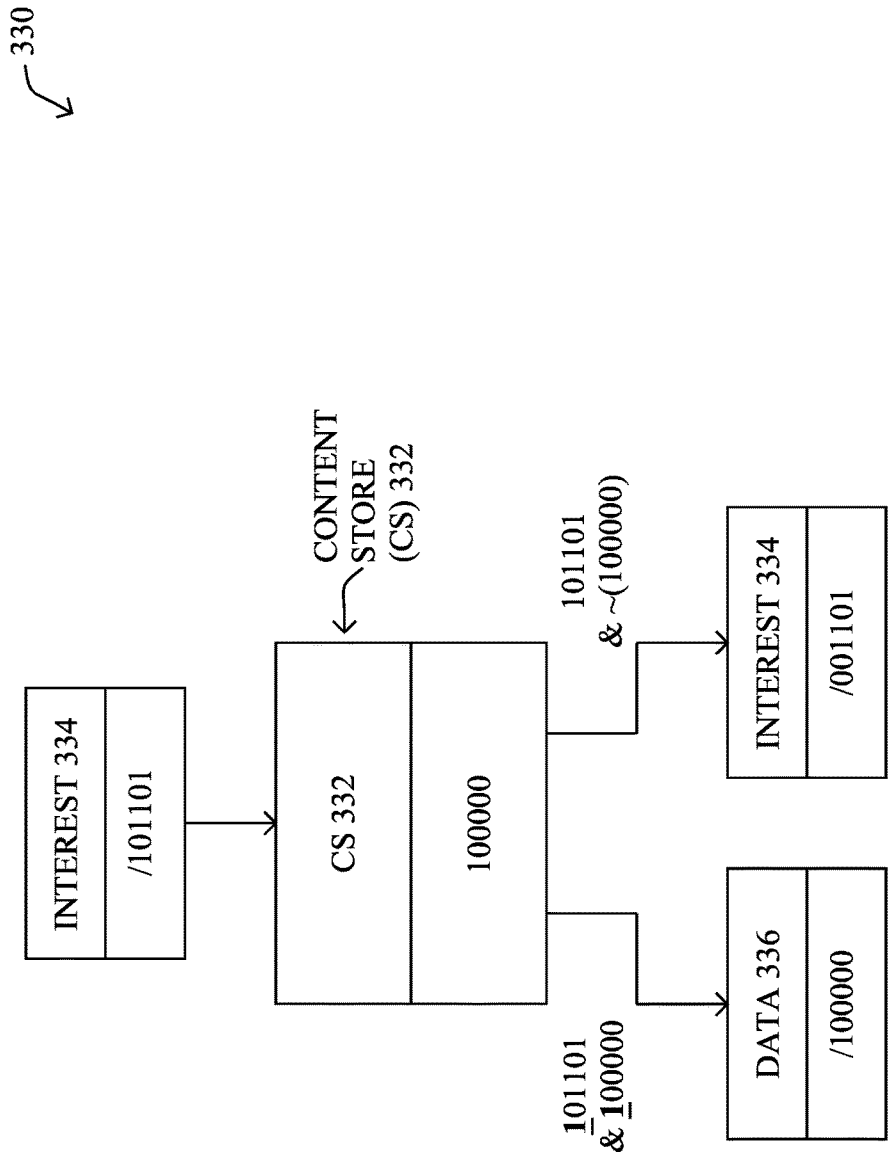

FIG. 3D illustrates an example 330 of the operation of a content store (CS) 332 when the router receives an interest packet 334. In various embodiments, CS 332 may include a single content store bitmap of size N and an associated storage area in memory that caches pieces of content data that the router receives. In the content store bitmap, each bit may signify that a different piece of content is available in the storage area.

In one embodiment, a lookup in the content store is done through an AND operation between the content store bitmap c and the interest bitmap i. This operation outputs a bitmap, which corresponds to the content that can be served directly from the content store. The remaining requests can be derived by performing (i AND NOT c).

For example, assume that CS 332 has the content store bitmap of '100000,' indicating that the first piece of content data is available from the cache storage area of the router, and that the router receives an interest 334 that includes the content request bitmap '101101.' In other words, the incoming interest is a combined query for the first, third, fourth, and sixth pieces of content data. Since the first piece of content data is available locally, the router may place this content data in a data packet 336, include a bitmap of '100000,' to signify that the packet includes the first piece of content data, and return data packet 336 in the opposite direction in the network from which interest 334 was received. However, since the third, fourth, and sixth pieces of content data are not available locally, the router may filter the bitmap of interest 334 using its bitmap entry in CS 332, thereby changing the bitmap of interest 334 to be '001101' In other words, since the router can satisfy the interest request for the first piece of content data, it may change the corresponding bit in interest 334 (e.g., the first bit from the left) before forwarding interest packet 334 on in the network.

Putting the table operations described in FIGS. 3A-3D together gives the following functionalities. When the router receives an interest packet, the router may extract the request bitmap from the interest and perform the following, in various embodiments:

1.) The router looks in its CS to determine which of the desired pieces of data are cached locally, if any. If any of the requested content is available, the router serves the available content (in a single data packet) and updates the request bitmap, accordingly.

2.) The router looks in its PIT to determine which of the requested pieces of content data already have pending interests outstanding, and removes them from the request bitmap. If any are not already outstanding for the incoming face, the router may update the PIT entry of the incoming face, using the above techniques.

3.) The router multiplexes requests that could not be satisfied by the CS or aggregated in the PIT according to its FIB. Said differently, the router may group requests according to their next hop and forward each group as another aggregated interest to its corresponding next hop.

On receiving a data packet, the router extracts the response bitmap and may perform the following, in various embodiments:

1.) By looking in its PIT, the router multiplexes the data packet. In particular, for each next hop awaiting a subset of the received pieces of data, it forwards the subset as one data packet named by the corresponding bitmap.

2.) The router updates its PIT to erase the entries corresponding to the forwarded pieces of content data.

3.) The router may also update its CS with the received pieces of data and perform a bitwise OR operation between the bitmap in the CS and the bitmap in the data packet. The resulting bitmap is the new bitmap in the CS. Note that the cache size of the device may be limited, especially in the case of LLN devices, and that a caching policy may be used to control whether the data is cached (e.g., based on a Least-Recently Used policy or the like).

FIGS. 4A-4E illustrate example packet processing by a network node/device, in various embodiments. As shown, a first through sixth node/device 200, denoted nodes A-F, may be interconnected by network links 402 to form a tree-shaped forwarding plane 400. In this case, a single PIT entry can be used, as all interests are coming from the same interface. As would be appreciated, the example shown is simplified for illustrative purposes and a typical network may have any number of interconnections between nodes and corresponding PIT entries.

Figure 4A:
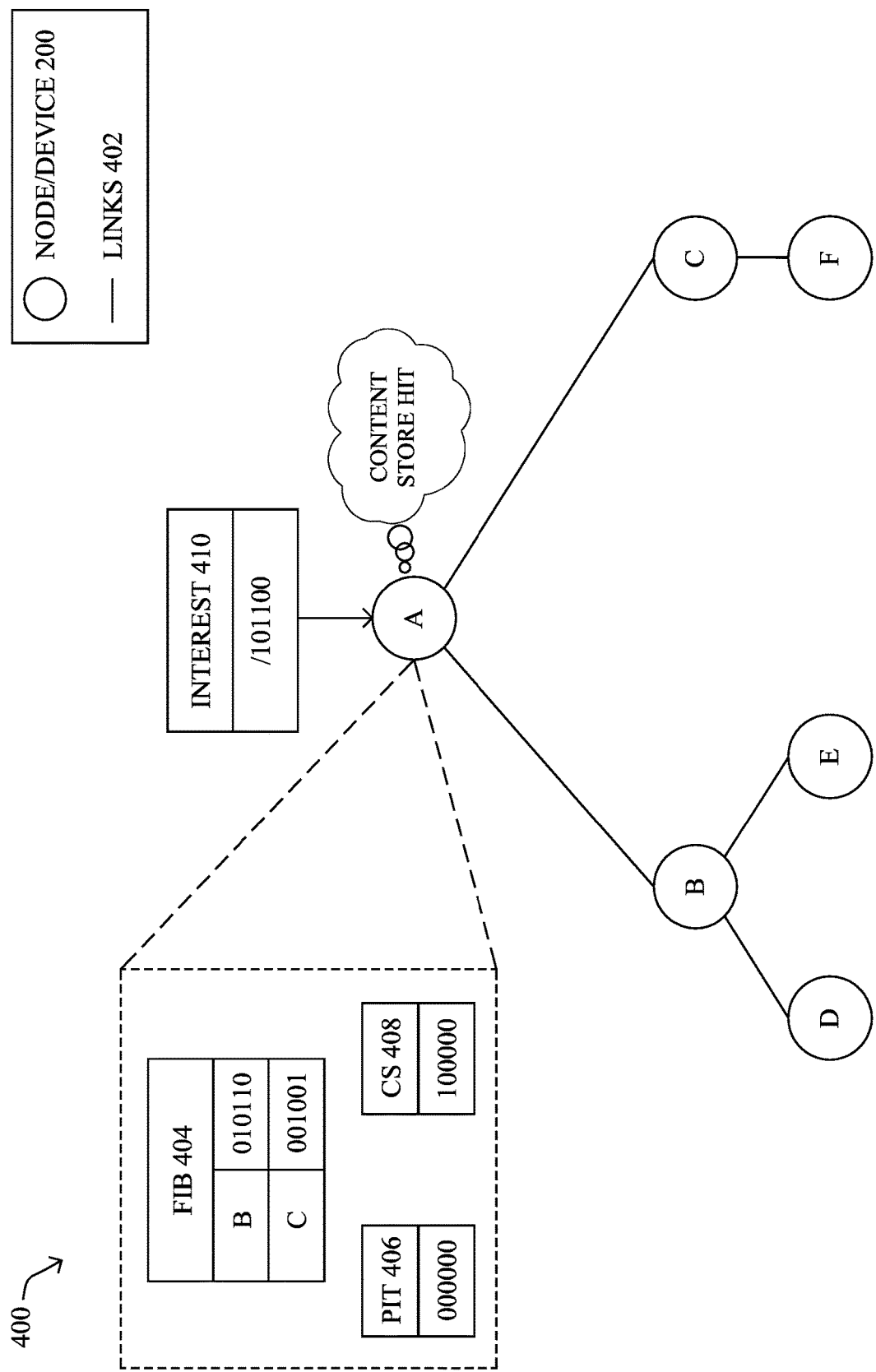
FIGS. 4A-4E illustrate example packet processing by a network node/device.

In FIG. 4A, assume that node A maintains a FIB. 404 that maps face 'B' for node B to a content availability bitmap '010110' and maps face 'C' for node C to a content availability bitmap of '001001.' In other words, the second, fourth, and fifth pieces of content data are available from one or more nodes via the link between nodes A and B. Similarly, the third and sixth pieces of content data are available from one or more nodes via the link between nodes A and C.

In addition to maintaining FIB 404, node A may also maintain a PIT 406 and CS 408. As shown, the single outstanding interest bitmap entry in PIT 406 may be '000000,' indicating that node A does not have any outstanding interests that have not been satisfied. In addition, as shown, CS 408 may include a content store bitmap entry of '100000,' thereby indicating that node A has a cached copy of the first piece of content data. For illustrative purposes, now assume that node A receives an interest packet 410 that includes the content request bitmap of '101100,' indicating that the first, third, and fourth pieces of named content data are being requested.

Figure 4B:
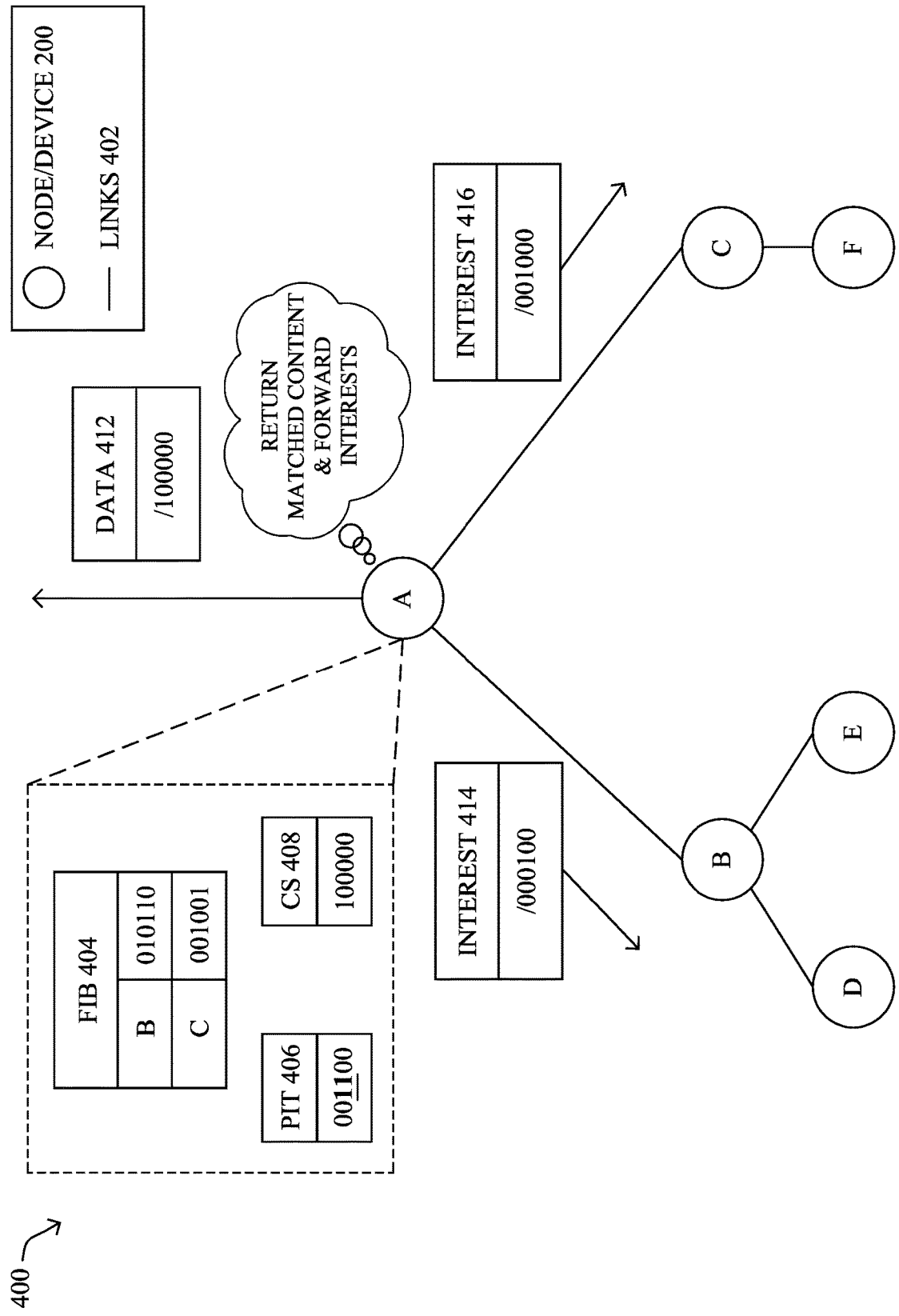

As shown in FIG. 4B, node A may assess CS 408 to determine that it can satisfy the request for the first piece of named content data (e.g., based on a match of the first bits of the bitmaps in CS 408 and interest 410). In such a case, node A may generate a data packet 412 that includes the first piece of content and return it back to the sender of interest packet 410. In some embodiments, node A may also include a bitmap of '100000' in data packet 412, to indicate that the packet includes the requested first piece of content data.

Since node A does not have the other pieces of data requested by interest packet 410, namely the third and fourth pieces of content data, node A may use the entries in FIB 404 to determine that the fourth piece of content data is available via its face 'B' and that the third piece of content data is available via its face 'C.' In turn, node A may send a corresponding interest packet 414 that includes the bitmap of '000100' to node B and an interest packet 416 that includes the bitmap of '001000' to node C. In addition, node A may update its PIT 406 to now reflect the bitmap of '001100,' indicating that interest requests for the third and fourth pieces of named content data are now outstanding.

Figure 4C:
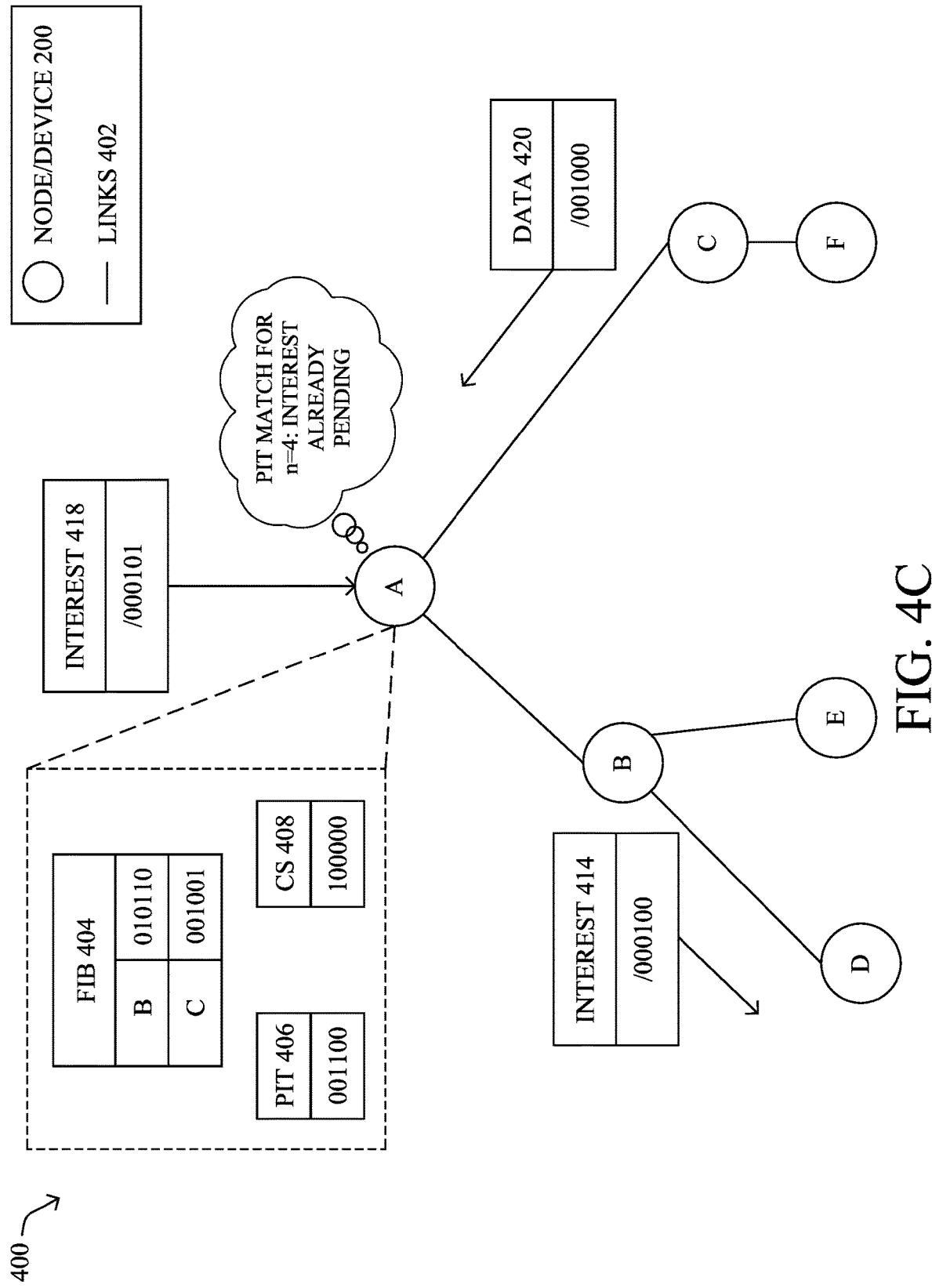

In FIG. 4C, now consider the case in which node A receives another interest packet 418 that requests the fourth and sixth pieces of named content data. Node A may determine that it does not have any locally cached copies of this content data, based on its entry in CS 408. In turn, node A may then assess its PIT 406 and determine that it already has an outstanding interest request for the fourth piece of content data (e.g., interest 414 that is currently being transmitted on to node D). Accordingly, node A will not retransmit this interest request, thereby conserving local and network resources.

However, since node A does not have a locally cached copy of the sixth piece of named content data, and does not have an outstanding interest request for this data, node A may determine that it should send an interest packet towards node C (e.g., based on the entries in FIB 404) and update its PIT 406, accordingly. While this processing is taking place, also assume that node C has processed interest 416 and has sent the requested third piece of content data back towards node A via data packet 420.

Figure 4D:
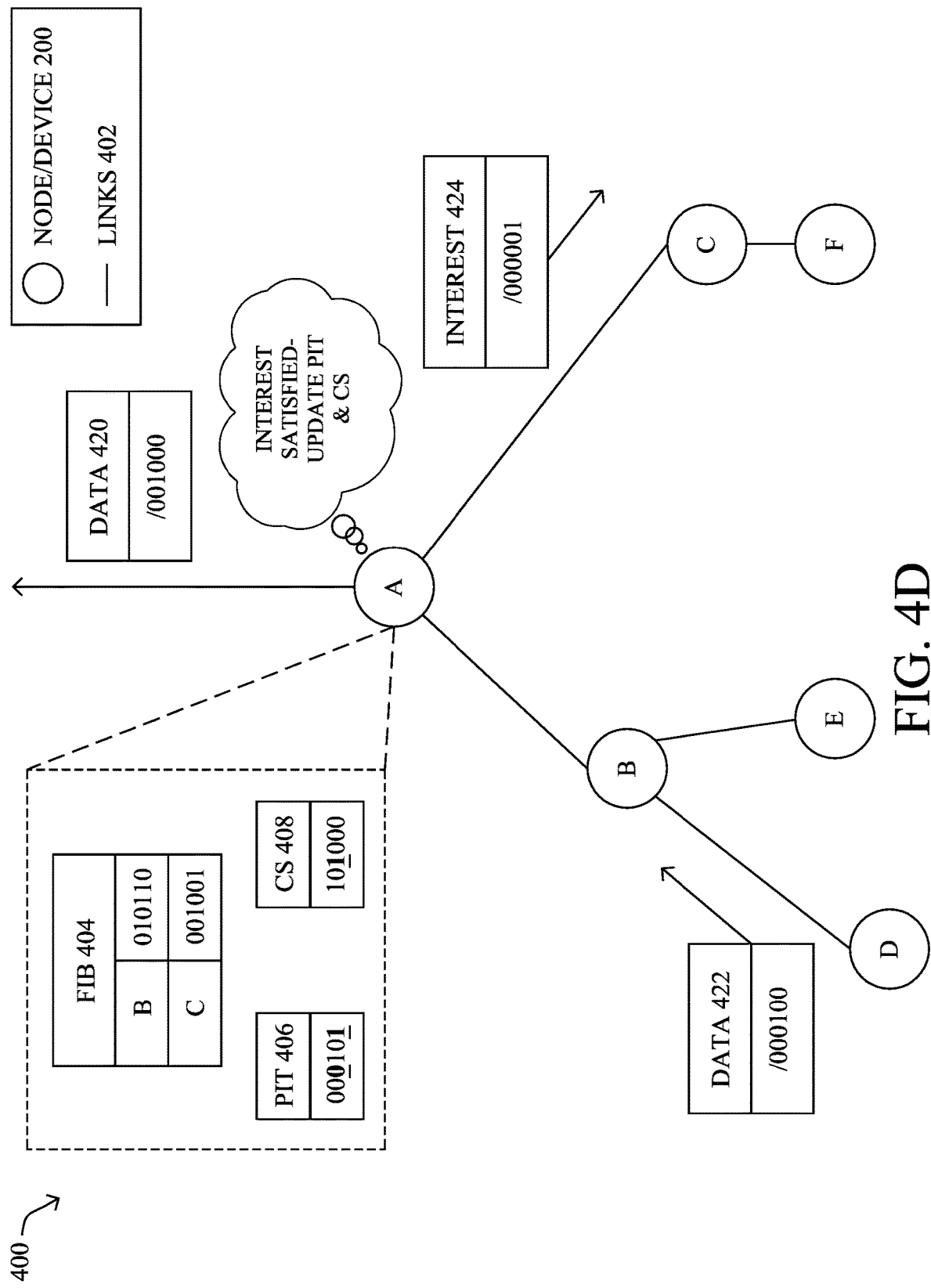

In FIG. 4D, node A may forward data packet 420 on towards the sender of interest 410 and update its PIT 406 bitmap to indicate that the interest for the third piece of content data is no longer outstanding. Depending on the configuration of node A, the node may also cache a local copy of the sixth piece of content data included in data packet 420 and update its CS 408 bitmap entry to indicate that this data is now available locally.

Also, as shown, to satisfy interest 418, node A may send an interest packet 424 with content request bitmap '000001,' towards node C, to request the sixth piece of content data. Accordingly, node A may update its bitmap entry in PIT 406 (e.g., by changing the sixth bit from a '0' to '1'), to indicate that an interest for this content is now outstanding. While this is occurring, assume that node D has processed interest 414 and has sent data packet 422 with the requested fourth piece of content data back towards node A via node B.

Figure 4E:
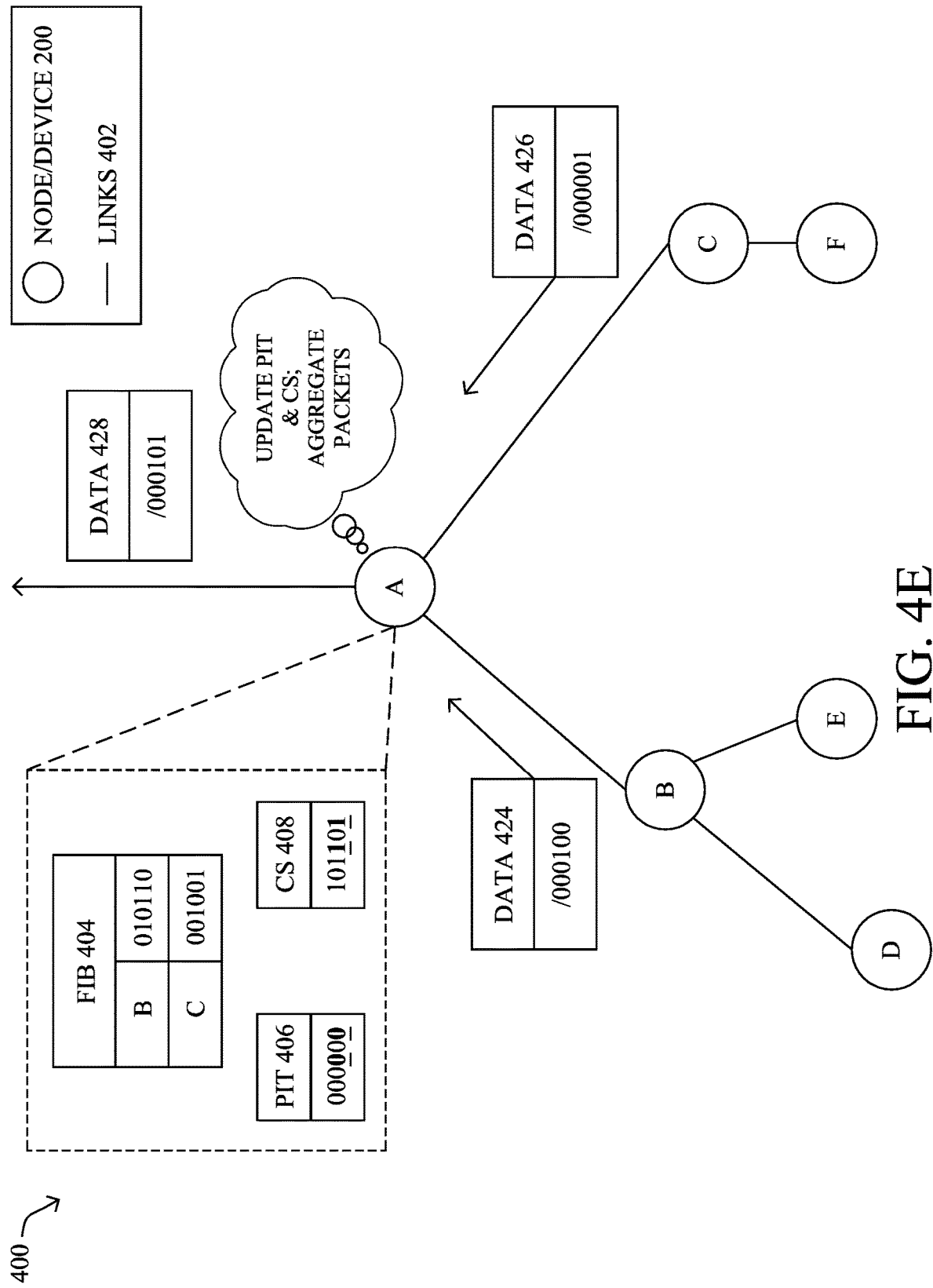

In FIG. 4E, node C may respond to interest packet 424 with a data packet 426 that includes the requested sixth piece of named content data. Now, assume that both data packets 424 and 426 arrive simultaneously at node A or within a very short period of time of one another (e.g., on the scale of milliseconds or less). In such a case, node A may update the bitmap entry in PIT 406 to indicate that no more interests are outstanding (e.g., by flipping the fourth. In addition, node A may locally cache the fourth and sixth pieces of content data and update its bitmap entry in CS 408, accordingly (e.g., by flipping the fourth and sixth bits to be '1').

In one embodiment, node A may aggregate the fourth and sixth pieces of named content data from data packets 424 and 426 into a single data packet 428. In addition, node A may set a bitmap of '000101' in data packet 428, to indicate that data packet 248 includes both pieces of content. In turn, node A may send data packet 428 to the sender of interest packets 410 and 418, thereby satisfying the final piece of content requested by interest packet 410 and the entire set of content requested by interest packet 418. By aggregating the content data, this also conserves network resources, in comparison to traditional ICN.

In some embodiments, the bitmap proposed herein may be used as a local network identifier, separately from a global network locator. For example, one can imagine a scheme where the original client sends a request using a globally routable name such as /Cisco/SJ/BuildingA/floor3/ [suffix], where the suffix is either directly a bitmap, or a request such as "average temperature" that can be handled by an API gateway. The bitmap would then only be used in the last mile to retrieve the necessary pieces of content. Such as scheme keeps the bitmap small (<100 bits) while enabling efficient forwarding at the edge of the network, e.g., for fog applications. Also, if encryption is used, one can follow the flow of incoming and outgoing packets to detect the multiplexing of the ICN interest.

Figure 5:
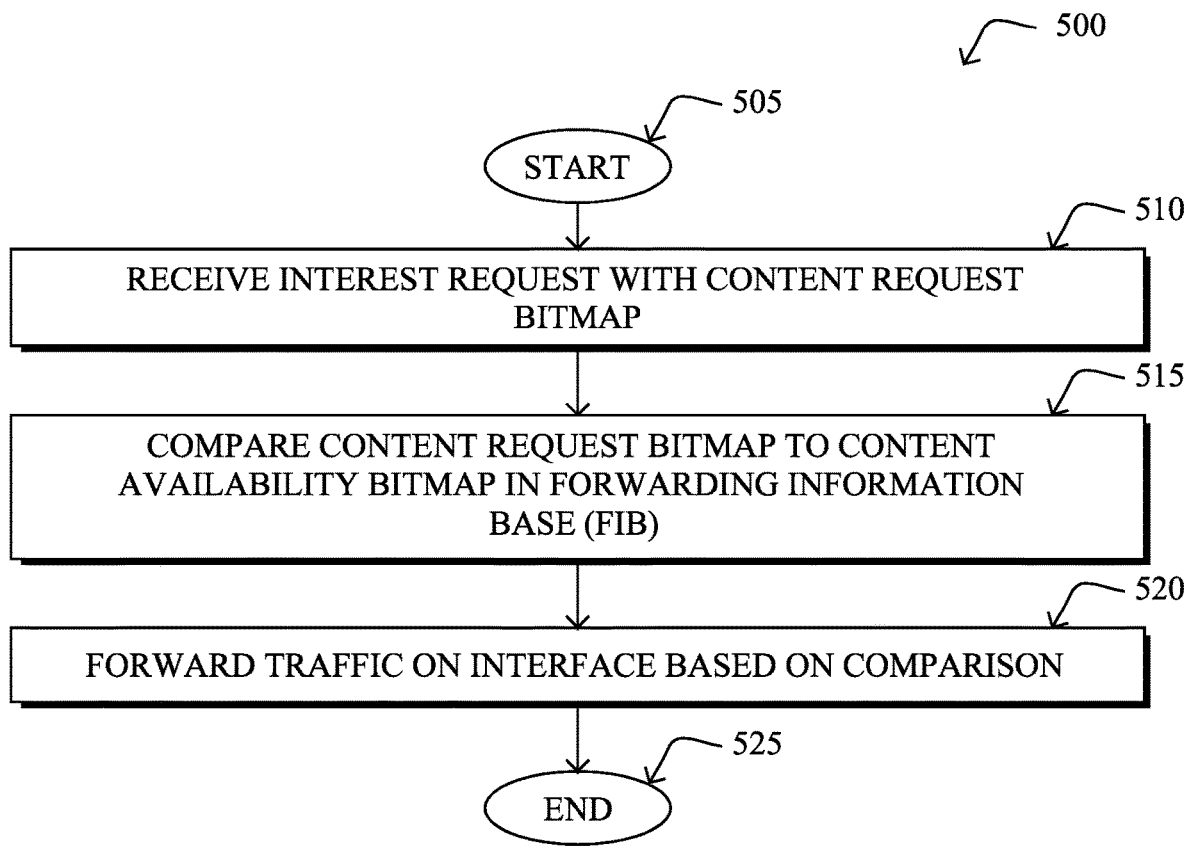
FIG. 5 illustrates an example simplified procedure for packet processing by a network node/device.

FIG. 5 illustrates an example simplified procedure for packet processing by a network node/device, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may receive an interest request for one or more pieces of content data available in the network.

In various embodiments, the received interest request specifies the one or more pieces of content data via one or more bits sets in a content request bitmap of the interest request. Each bit of the content request bitmap may be associated with a different piece of content data available from the network. For example, assume that there are three different pieces of content data available: a temperature reading, a pressure reading, and a humidity reading from distributed sensors in the network. In such a case, the content request bitmap may be 3-bits long, with the first bit associated with the temperature reading, the second bit associated with the pressure reading, and the third bit associated with the humidity reading (e.g., a content request bitmap of '100' may be used to request the temperature reading, etc.).

At step 515, as detailed above, the device may compare the content request bitmap to a content availability bitmap in a forwarding information base (FIB) of the device. In various embodiments, the content availability bitmap in the FIB is associated with a particular interface of the device. Each bit of the content availability bitmap may also indicate whether a particular piece of content data is available via the particular interface. For example, continuing the case of the three sensor readings mentioned above, a content availability bitmap of '010' for an (inter)face of the device may indicate that the pressure reading can be obtained via that interface.

At step 520, the device may forward the interest request via the particular interface of the device, based on the comparison between the content request bitmap and the content availability bitmap in the FIB of the device, as described in greater detail above. In some cases, the device may adjust the content request bitmap of the interest request, prior to forwarding and based on the comparison. For example, if only the temperature reading is available via face A, the device may adjust the content request bitmap to be '100.' In various embodiments, the device may also first determine whether a local copy of the requested content data is in a cache of the device. If so, the device may simply fulfill the request directly. Additionally, in some embodiments, the device may compare the content request bitmap to a bitmap that represents the pieces of content for which interest requests by the device are already pending. For example, if the device is awaiting a response to an interest request for the temperature reading, it may determine that sending a second such request is unnecessary. Procedure 500 then ends at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for lower memory consumption than that of traditional ICN forwarding. Notably, instead of variable length names for different pieces of content data, the techniques herein propose using fixed size bitmaps. This helps to reduce the memory footprint, as N-number of names can be represented using a single bitmap with N-number of bits. This is particularly crucial for coding stacks in IoT platforms, since dynamic memory allocation has a large memory overhead. The techniques herein also provide for reduced energy consumption, as the number of interest and/or data packets that are sent via the network can be aggregated. In addition, by reducing the number of forwarded packets, the collision probability on the wireless broadcast channel(s) in use also decreases. Further, efficiency is increased in terms of forwarded bytes/retrieved data since several requests can share the same L2 and L3 headers for interest and data packets. The techniques herein also reduce latency for multi-data requests. Notably, by reducing the collision probability by aggregating interest and data packets, this also reduces the amount of time spent in exponential back-off (e.g., as in CSMA-CA) or waiting for one's turn to transmit (e.g., as in TSCH).

While there have been shown and described illustrative embodiments that provide for a lightweight ICN naming scheme, it is to be understood that various other adaptations and modifications may be made within the spirit and scope of the embodiments herein. For example, while certain embodiments are described herein with respect to using certain paradigms for retrieving content from a network, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, an interest request for one or more pieces of content data available in the network, wherein the interest request specifies the one or more pieces of content data via one or more bits sets in a content request bitmap of the interest request, each bit of the content request bitmap being associated with a different piece of content data available from the network;
comparing, by the device, the content request bitmap to a content availability bitmap in a forwarding information base (FIB) of the device, wherein the content availability bitmap in the FIB is associated with a particular interface of the device and each bit of the content availability bitmap indicates whether a particular piece of content data is available via the particular interface; and
forwarding, by the device, the interest request via the particular interface of the device, based on the comparison between the content request bitmap and the content availability bitmap in the FIB of the device.

2. The method as in claim 1, wherein comparing the content request bitmap to the content availability bitmap in the FIB of the device comprises:
determining, by the device, that only a portion of the requested pieces of content is available via the particular interface, based on a bitwise comparison between the content request bitmap and the content availability bitmap; and
adjusting, by the device, the content request bitmap of the interest request, prior to forwarding, to request only the portion of the requested pieces of content data available via the particular interface.

3. The method as in claim 1, wherein each bit of the content request bitmap is associated with a different Interest-Centric Networking (ICN) name for a corresponding piece of content data available in the network.

4. The method as in claim 1, wherein the one or more pieces of content data comprise one or more sensor readings from sensors in the network.

5. The method as in claim 1, further comprising:
comparing, by the device, the content request bitmap to a content store bitmap in a content store (CS) table, wherein each bit of the content store bitmap indicates whether a particular piece of content data is cached locally by the device.

6. The method as in claim 5, further comprising:
retrieving, by the device, a piece of content data from a local cache of the device, when bits of the content request bitmap and the content store bitmap that are associated with the cached piece of content data match; and
sending, by the device, a data packet to a sender of the received interest request, wherein the data packet includes the piece of content data retrieved from the local cache of the device and a bitmap having a bit set to indicate that the packet includes the piece of content data.

7. The method as in claim 1, further comprising:
comparing, by the device, the content request bitmap to an outstanding interest bitmap in a pending interest table (PIT) of the device, wherein each bit of the outstanding interest bitmap is associated with a different piece of content data and indicates whether the device has sent an unsatisfied interest request for that piece of content data.

8. The method as in claim 7, further comprising:
adjusting, by the device, the content request bitmap of the interest request, prior to forwarding and based on the comparison between the content request bitmap and the outstanding interest bitmap in the PIT of the device, to request only a portion of the requested pieces of content data that do not have unsatisfied interest requests pending.

9. The method as in claim 1, further comprising:
merging, by the device, two or more interest requests into a single interest request by logically combining content request bitmaps of the two or more interest requests into a single content request bitmap.

10. The method as in claim 1, further comprising:
aggregating, by the device, two or more pieces of content data into a single data packet; and
setting, by the device, individual bits of a bitmap in the data packet to indicate that the data packet includes the two or more pieces of content data, wherein each bit of the bitmap in the data packet is associated with a different piece of content data.

11. An apparatus, comprising:
one or more network interfaces to communicate with a network;
a processor coupled to the network interfaces and configured to execute one or more processes; and
a memory configured to store a process executable by the processor, the process when executed configured to:
receive an interest request for one or more pieces of content data available in the network, wherein the interest request specifies the one or more pieces of content data via one or more bits sets in a content request bitmap of the interest request, each bit of the content request bitmap being associated with a different piece of content data available from the network;
compare the content request bitmap to a content availability bitmap in a forwarding information base (FIB) of the apparatus, wherein the content availability bitmap in the FIB is associated with a particular interface of the apparatus and each bit of the content availability bitmap indicates whether a particular piece of content data is available via the particular interface; and
forward the interest request via the particular interface of the apparatus, based on the comparison between the content request bitmap and the content availability bitmap in the FIB of the apparatus.

12. The apparatus as in claim 11, wherein the apparatus compares the content request bitmap to the content availability bitmap in the FIB of the apparatus by:
determining that only a portion of the requested pieces of content is available via the particular interface, based on a bitwise comparison between the content request bitmap and the content availability bitmap; and
adjusting the content request bitmap of the interest request, prior to forwarding, to request only the portion of the requested pieces of content data available via the particular interface.

13. The apparatus as in claim 10, wherein each bit of the content request bitmap is associated with a different Interest-Centric Networking (ICN) name for a corresponding piece of content data available in the network.

14. The apparatus as in claim 10, wherein the process when executed is further configured to:
compare the content request bitmap to a content store bitmap in a content store (CS) table, wherein each bit of the content store bitmap indicates whether a particular piece of content data is cached locally by the apparatus.

15. The apparatus as in claim 14, wherein the process when executed is further configured to:
retrieve a piece of content data from a local cache of the apparatus, when bits of the content request bitmap and the content store bitmap that are associated with the cached piece of content data match; and
send a data packet to a sender of the received interest request, wherein the data packet includes the piece of content data retrieved from the local cache of the apparatus and a bitmap having a bit set to indicate that the packet includes the piece of content data.

16. The apparatus as in claim 10, wherein the process when executed is further configured to:
compare the content request bitmap to an outstanding interest bitmap in a pending interest table (PIT) of the apparatus, wherein each bit of the outstanding interest bitmap is associated with a different piece of content data and indicates whether the apparatus has sent an unsatisfied interest request for that piece of content data.

17. The apparatus as in claim 16, wherein the process when executed is further configured to:
adjust the content request bitmap of the interest request, prior to forwarding and based on the comparison between the content request bitmap and the outstanding interest bitmap in the PIT of the apparatus, to request only a portion of the requested pieces of content data that do not have unsatisfied interest requests pending.

18. The apparatus as in claim 10, wherein the process when executed is further configured to:
merge two or more interest requests into a single interest request by logically combining content request bitmaps of the two or more interest requests into a single content request bitmap.

19. The apparatus as in claim 10, wherein the process when executed is further configured to:
aggregate two or more pieces of content data into a single data packet; and
set individual bits of a bitmap in the data packet to indicate that the data packet includes the two or more pieces of content data, wherein each bit of the bitmap in the data packet is associated with a different piece of content data.

20. A tangible, non-transitory, computer-readable medium storing program instructions that cause a device in a network to execute a process comprising:

receiving, at the device in the network, an interest request for one or more pieces of content data available in the network, wherein the interest request specifies the one or more pieces of content data via one or more bits sets in a content request bitmap of the interest request, each bit of the content request bitmap being associated with a different piece of content data available from the network;

comparing, by the device, the content request bitmap to a content availability bitmap in a forwarding information base (FIB) of the device, wherein the content availability bitmap in the FIB is associated with a particular interface of the device and each bit of the content availability bitmap indicates whether a particular piece of content data is available via the particular interface; and forwarding, by the device, the interest request via the particular interface of the device, based on the comparison between the content request bitmap and the content availability bitmap in the FIB of the device.

* * * * *